Figure 1:
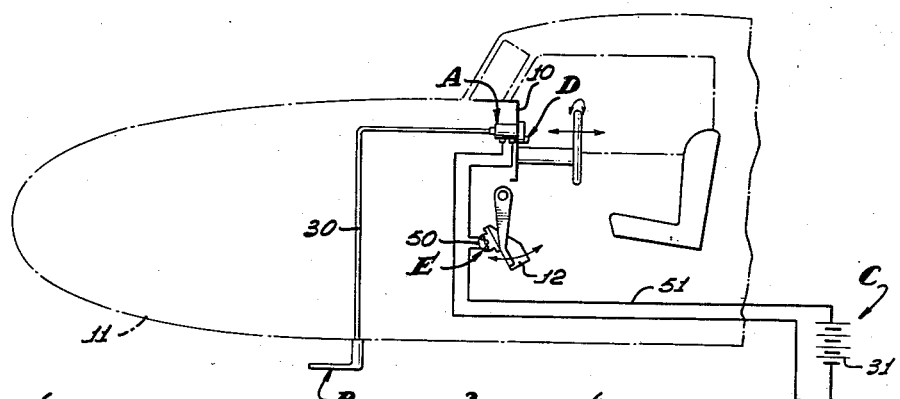

March 18, 1958     J. B. REICHERT ET AL     2,827,621

AIR SPEED ALERTING APPARATUS FOR AIRCRAFT

Filed May 23, 1955

INVENTORS:
JAMES B. REICHERT
WILLIAM H. MAXWELL, JR.

United States Patent Office 2,827,621
Patented Mar. 18, 1958

2,827,621
AIR SPEED ALERTING APPARATUS FOR AIRCRAFT
James B. Reichert and William H. Maxwell, Jr., Los Angeles, Calif.
Application May 23, 1955, Serial No. 510,256
2 Claims. (Cl. 340—27)

This invention is concerned with an air speed alerting apparatus for aircraft, it being a general object of the invention to provide a reliable and accurate mechanism for warning the pilot of impending danger when the aircraft closely approaches a particular speed, for example, a minimum approach speed or the stalling speed.

The stalling speed of an airplane is a function of the wing loading or gross weight and the maximum lift coefficient of the wing. Modern aircraft of the conventional heavier than air type have extremely high wing loading and consequently have extremely high take-off and landing speeds. That is, the aircraft of the present day stalls at a relatively high speed and consequently the margin of error is small in selecting the proper or safe speed for a landing approach. It will be apparent that the lowest landing or approach speeds are desirable within a safe margin relative to the stalling speed of the aircraft.

Heretofore, various warning devices have been employed to warn the pilot when the aircraft has decelerated to a speed dangerously close to the stalling speed of the craft. That is, devices have been provided that allegedly anticipate the stagnation point of the air foil of the wing at the prestall attitude of the aircraft. In general, the devices referred to are characteristically complex, require a great deal calibration, and are, in practice, faulty since they are affected to a great degree by small changes in the trim of the aircraft and by the particular loading imposed upon the wing or air frame. In fact, the margin of error in such devices prohibits their practical use on aircraft.

One of the most reliable and accurate instrumentation systems on an aircraft is the air speed indicating system. Such systems are not only accurate, but are considered foolproof and failsafe. Such a system includes a Pitot tube which may include heaters, etc., and a pressure sensitive indicating instrument which may include compensating means, etc. It is this instrumentation system that we have employed in connection with the apparatus of the present invention.

An object of this invention is to provide an air speed alerting apparatus for aircraft wherein there is a visual, or an audio, or a feel sensing means for warning the pilot of the approach to a particular predetermined speed of the craft. Though the pilot may refer to the speed of the craft by viewing the air speed indicating instrument, his attention is absorbed in properly guiding or piloting the craft. Therefore, an alerting device in the form of a shaker is included in the apparatus which creates vibrations that are sensed by the pilot through one or more of the controls which must be manipulated by him to guide the craft.

It is another object of this invention to provide an adjustable instrument of the character referred to that may be set at any desired predetermined speed as circumstances require. In operating any particular aircraft, the flight characteristics and phenomenon are determined and can be accurately anticipated. For example, the pilot knows of the approximate gross weight or wing loading of the aircraft at any time during the flight, and from experience or from engineering data or information, he knows that the aircraft will have a certain performance at a certain given speed. The instrument that we have provided is, therefore, manually adjusted in order to warn the pilot before the airplane decelerates to that given speed.

It is still another object of this invention to provide a selective speed indicating system for aircraft that does not require additional instruments to be added to the already overcrowded instrument panel or console of the aircraft. The mechanism that we employ is associated with and is incorporated in the air speed indicating instrument at the instrument panel.

It is a further object of this invention to provide an apparatus of the character referred to which is a variable warning device that may be sensed by the pilot as the minimum safe speed of the aircraft is approached and which includes a shaker that operates with increased speed or intensity so that the pilot can easily and immediately sense the condition of the craft without taking his attention from other necessary flight conditions.

An object of this invention is to provide a reliable and inexpensive system for warning the pilot of an aircraft of the proximity of a particular performance speed, for example the stalling speed, thereof that is easily manufactured, that is easily installed in the aircraft, and that is easily maintained in proper working condition.

Figure 2:
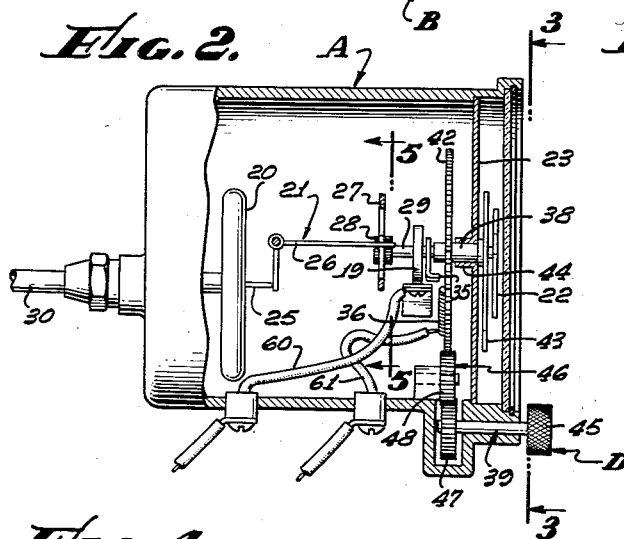
Figure 3:
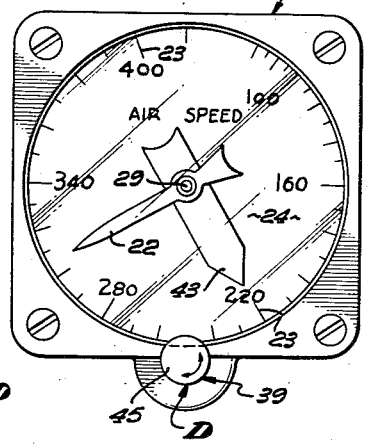
Figure 4:
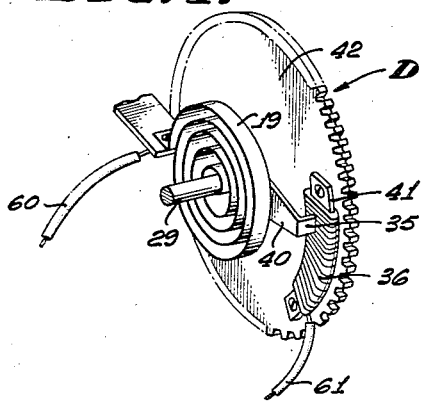
Figure 5:
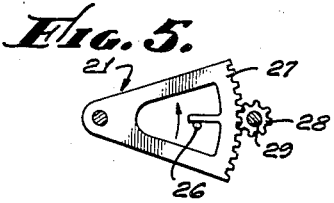

The various objects and features of our invention will be fully understood from the following detailed description of a typical preferred form and application of our invention, throughout which description reference is made to the accompanying drawings, in which:

Fig. 1 is a view of a portion of an aircraft showing diagrammatically the system provided by the present invention. Fig. 2 is an enlarged detailed sectional view of that apparatus that we have provided and which is incorporated in an air speed indicating instrument. Fig. 3 is a front view of the instrument taken as indicated by line 3—3 on Fig. 2. Fig. 4 is an enlarged detailed perspective view of a portion of the mechanism employed in the instrument, and Fig. 5 is a sectional view of a portion of the mechanism taken as indicated by line 5—5 on Fig. 2.

The stall sensing apparatus that we have provided is incorporated in the aircraft air speed indicating system and a portion thereof is, in fact built into the air speed indicating instrument located in the pilot's console or instrument panel. As shown diagrammatically in Fig. 1 of the drawings, the apparatus involves, generally, an air speed indicating instrument A, a Pitot tube B, a power supply C, control means D, and an alerting means or shaker E. The instrument A is mounted in the instrument panel 10 of the aircraft while the Pitot tube B is carried by the fuselage 11 of the aircraft to be exposed to the air stream at the exterior thereof. The power supply C is indicated as a D. C. supply of electrical current, and the shaker E is shown mounted on one of the controls or rudder pedals 12. It will be apparent that when the shaker operates, the pedal 12 is vibrated in a manner to be sensed by the pilot of the craft.

The air speed indicating instrument A may be basically any ordinary instrument of the character under consideration and involves a pressure sensitive diaphragm 20 and a mechanical linkage 21 between the diaphragm and an air speed pointer 22 that moves between suitable calibrations 23 on a dial or card 24. The instrument A may include various other features such as illuminating means and compensating means in the manner common to such instruments.

The particular instrument A illustrated has an anvil 25 that projects from the diaphragm 20 which operates a lever or bell crank 26 of the linkage 21. As shown in Fig. 5, the crank 26 has an arm that engages and rotates a gear segment 27 which in turn rotates a pinion 28 carried on a pointer shaft 29. A spring 19 in the form of a convolute element surrounds the shaft 29 and yieldingly urges the shaft 29 and pointer 22 and linkage 21 to the normal or unactuated position. It will be readily understood how the pointer 22 carried on the shaft 29 rotates or moves between the calibrations 23 as the diaphragm 20 spreads or inflates under the influence of increasing air pressure.

The Pitot tube B is carried at the exterior of the aircraft fuselage 11 and faces into the air stream. The Pitot tube may include a ram air tube and a static air tube which may be individually connected to the instrument A. However, for simplicity of illustration, we have shown only a single pressure connection 30 between the instrument A and the Pitot tube B, it being understood that the static connection may be employed if so desired in order to operate means of the instrument A, such, for example, barometric pressure compensating means. The connection 30 joins with the diaphragm 20 to transmit air pressure from the Pitot tube B to the diaphragm in order to operate the diaphragm and linkage 21 as above described.

The power supply may be any suitable source of energy adapted to operate the particular alerting means or shaker employed. In the case illustrated, the alerting means E is an electrical device in which case the power supply C is an electrical power supply. In practice, the electrical system of the aircraft is utilized in which case electrical energy is drawn from the generating system of the craft or from a storage battery 31.

The control means D which characterizes the present invention, is built into the instrument A and involves, generally, relatively shiftable contacts 35 and 36, the contact 35 being carried and rotated through an arc by the shaft 29, and the contact 36 being carried on and rotated through an arc by a control shaft 38, and a manually operable adjusting means 39.

The contact 35 is in the nature of a wiping contact and is at the outer end of an arm 40 fixed on the shaft 29 and operating with the pointer 22. In fact, by comparison of Figs. 3 and 4 of the drawings, it will be seen that the pointer 22 and arm 40 project laterally from the shaft 29 in the same plane.

The contact 36 is in the nature of a sliding contact adapted to have sliding engagement with the contact 35 and is preferably a resistance contact. As shown, the contact 36 is in the form of a variable resistance element wound around a core 41. The core 41 is arcuately formed and is carried on a disc-shaped carrier 42 and is concentric with the axis of the shaft 29 and the shaft 38. The carrier 42 is preferably made of insulating material and is secured to the inner end of shaft 38 to occur adjacent the wiping contact 35.

In accordance with the form of the invention shown, the control shaft 38 is a tubular or sleeve-like part that is rotatably carried on the shaft 29, and a control pointer 43 is carried at the outer end of the shaft 38 to occur between the dial 24 and the pointer 22. The contact 36 is preferably laterally offset from the shaft 38 in the same plane that the pointer 43 projects therefrom (see Figs. 3 and 4). As shown, the shaft 29 is rotatably carried by the shaft 38 which is in turn rotatably carried by a bearing 44 at the center of the dial 24. It is to be understood that various other constructions may be employed to carry the pointer 43. For example, the pointer 43 may be carried at the periphery of the carrier 42 and may project through an arcuate slot near the periphery of the dial 24, in which case, the pointer would point inwardly toward the calibrations 23.

The adjusting means 29 is provided to adjustably position the contact 36 as indicated on the dial 24 by the pointer 43. The means 39 is preferably a manual means and, in the preferred form of the invention, involves a control knob 45 that projects from the front face of the instrument A and a drive 46 between the knob 45 and disc-shaped carrier 42. As shown, the carrier 42 is in the nature of a gear having a continuous series of teeth at the periphery thereof and the drive 46 includes suitable gearing, there being a drive pinion 46 rotated by the knob 45 and a suitable idler 48 between the pinion 47 and the carrier 42. It will be apparent that when the knob is rotated, the carrier and contact 36 are correspondingly moved or shifted.

The alerting means or shaker E may be any suitable alerting device such as are commonly employed or used, and in practice, may be a simple electric motor 50 driving an eccentric weight. As the speed of the motor is increased, the violence or intensity of the vibration is accordingly increased. The motor 50, and contacts 35 and 36 are preferably in series in an electric circuit or line 51 that carries the electrical current supplied by the battery 31 so that when the contacts 35 and 36 come together, the motor 50 is operated. It will be readily understood that the variable resistance feature of the contact 36 is provided for increased speed of the motor 50 as the air speed of the aircraft approaches the lower end of the resistance element of the contact.

From the foregoing, it will be apparent that we have provided an extremely simple and inexpensive apparatus for indicating the proximity of a particular predetermined speed of the aircraft and which may be incorporated in the aircraft without additional space requirements and with very little added expense. The mechanism that we have provided is incorporated in a reliable, highly developed system which deals directly with the speed of the craft. Further, only a single sliding contact or engagement is made in the mechanism through the contacts 35 and 36 which are in effect such as to form a variable resistance or rheostat mechanism. The only wiring required in the instrument A is a pair of lead wires or pig tails 60 and 61 that connect with the contacts 35 and 36, respectively.

Having described only a typical preferred form and application of our invention, we do not wish to be limited or restricted to the specific details herein set forth, but wish to reserve to ourselves any variations or modifications that may appear to those skilled in the art and fall within the scope of the following claims.

Having described our invention, we claim:

1. An air speed alerting apparatus for aircraft, including, an air speed responsive instrument having a rotating shaft carrying a pointer, a control means including a contact carried by the shaft into and out of engagement with a second selectively positioned variable resistance contact, and a variable alerting means responsive to the relative positions of the control contacts to be sensed by the pilot of the aircraft, said second contact being carried on a manually adjustable tubular shaft surrounding the instrument shaft and carrying a second pointer.

2. In combination, an aircraft with an air speed responsive instrument, control means including relatively shiftable contacts, one of said contacts being carried by a movable element responsive to air speed and the other of said contacts being carried on a manually positioned carrier and the first mentioned contact being operable into and out of engagement with the said other contact, one of said contacts being a variable resistance, and an alerting means controlled by said contacts and comprising a shaker driven by a variable speed motor and coupled to the aircraft controls to be sensed by the pilot of the aircraft.

References Cited in the file of this patent

UNITED STATES PATENTS

| | | |
|---|---|---|
| 2,078,982 | Stark | May 4, 1937 |
| 2,094,001 | De Florez | Sept. 28, 1937 |
| 2,128,250 | Howard et al. | Aug. 30, 1938 |
| 2,454,587 | Arnold | Nov. 23, 1948 |
| 2,474,610 | Wunsch | June 28, 1949 |
| 2,484,038 | Kirlin | Oct. 11, 1949 |
| 2,586,010 | Divoll | Feb. 19, 1952 |